May 19, 1931. H. F. HITNER Re. 18,071
APPARATUS FOR MELTING GLASS AND SIMILAR SUBSTANCES
Original Filed Feb. 4, 1929 2 Sheets-Sheet 1
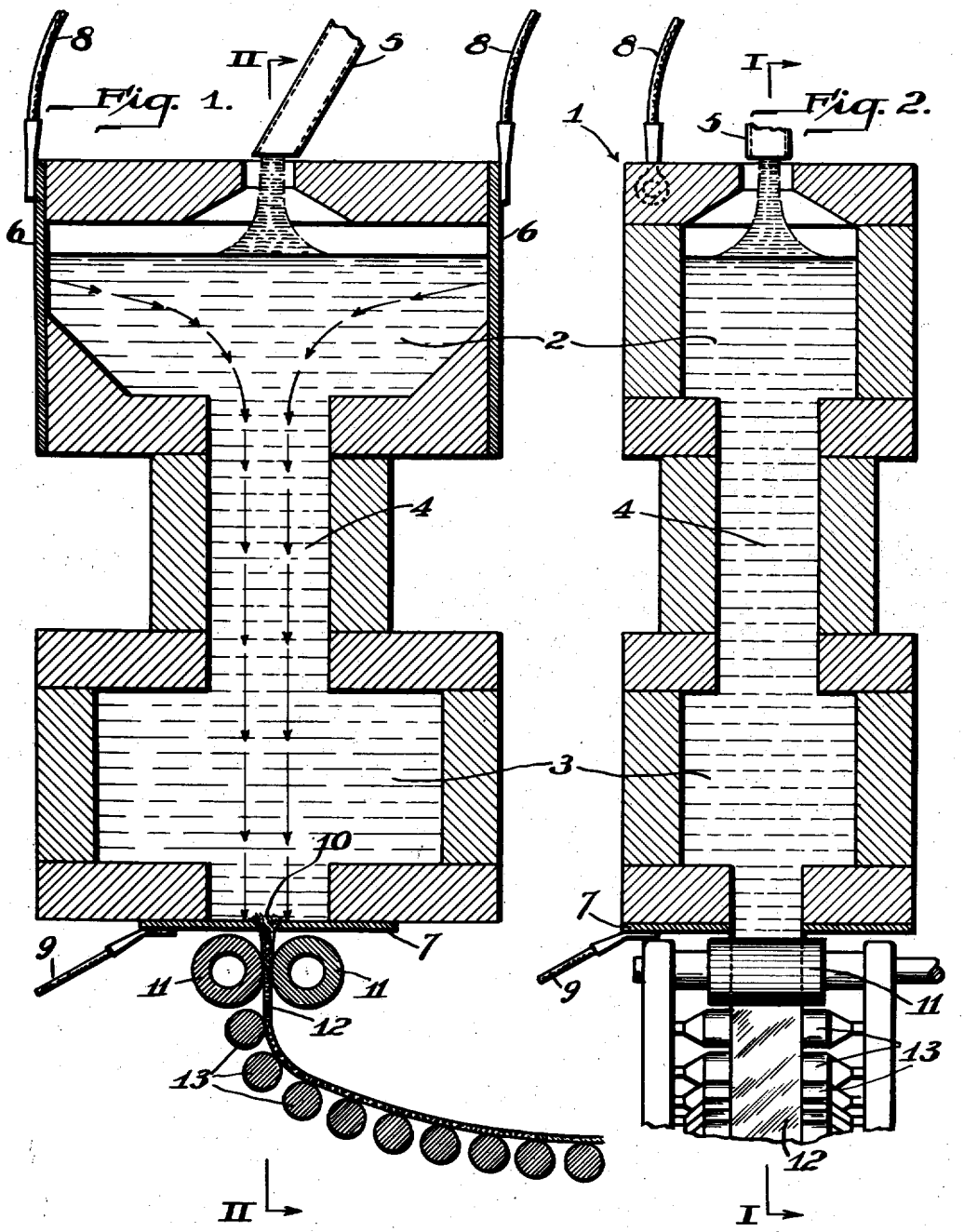
INVENTOR
Harry F. Hitner
by
James C. Bradley
Atty May 19, 1931. H. F. HITNER Re. 18,071

APPARATUS FOR MELTING GLASS AND SIMILAR SUBSTANCES

Original Filed Feb. 4, 1929 2 Sheets-Sheet 2

INVENTOR

Harry F. Hitner by

James C. Bradley

Atty.

Reissued May 19, 1931

Re. 18,071

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

APPARATUS FOR MELTING GLASS AND SIMILAR SUBSTANCES

Original No. 1,761,342, dated June 3, 1930, Serial No. 337,297, filed February 4, 1929. Application for reissue filed December 13, 1930. Serial No. 502,232.

Figure 3:
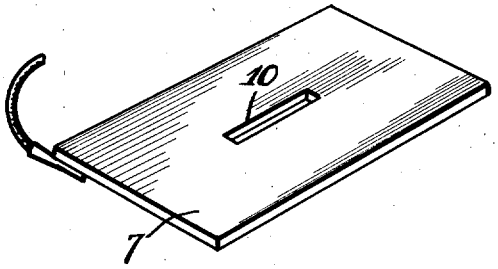
Figure 4:
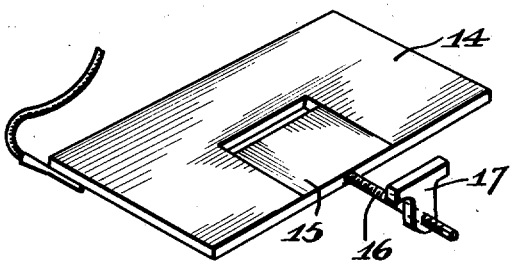
Figure 5:
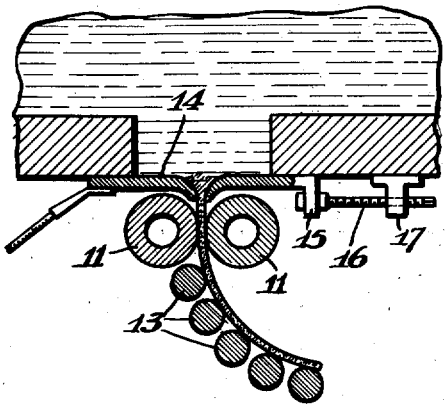
Figure 6:
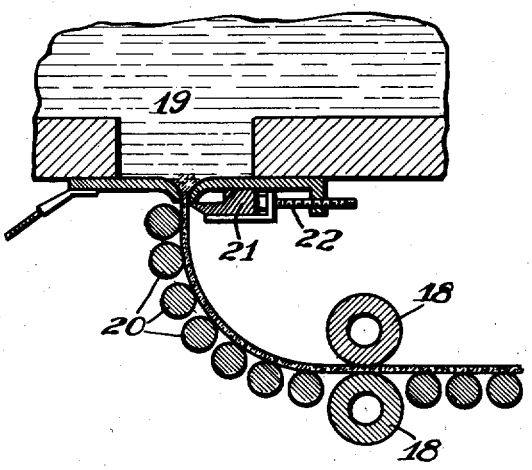

The invention relates to apparatus for melting glass and similar substances, and more particularly to apparatus for melting glass continuously using electric current for bringing the glass to the proper temperature for sheet formation. The invention has for its principal objects the provision of an improved apparatus (1) having an outlet slot member which is relatively permanent as opposed to clay slot members as heretofore employed, (2) in which any contamination of the fused material incident to the flow thereof through the slot member is avoided, (3) in which the temperature of the fused material at the outlet slot is easily controlled and regulated, and (4) which gives a product containing less ream and blister than that produced from apparatus now in use employing a clay outlet slot member. Certain embodiments of the invention are illustrated in the accompanying drawings, wherein:

Figure 1 is a vertical section through the tank on the line I—I of Fig. 2. Fig. 2 is a vertical section on the line II—II of Fig. 1. Fig. 3 is a perspective view of one of the electrode plates. Fig. 4 is a perspective view of a modified form of electrode plate. Fig. 5 is a vertical section through the lower portion of a furnace employing the electrode plate of Fig. 4. And Fig. 6 is a vertical section through the lower portion of a modified construction.

Referring to Figs. 1 and 2, 1 is a melting tank comprising a melting end 2 and a withdrawing end 3 connected by the neck portion 4. Batch is introduced from the pipe 5 through the top wall of the furnace and is melted by an electric current flowing between the electrode plates 6, 6 and the plate 7. The plates are of any suitable refractory metal or composition, preferably an alloy of iron and chromium, containing about 25 per cent of chromium. Single phase, alternating current is preferably used, the two leads 8, 8 being connected to one supply line from the generator and the lead 9 being connected to the other line.

The plate 7 is provided with an outlet slot 10 and in opposition to this slit, for receiving the flow therefrom, is a pair of water cooled driven sizing rolls 11, 11. These rolls form the outcoming flow of glass into a sheet 12 of definite thickness which then passes onto the apron rolls 13 which conduct the sheet into and through a roller leer, not shown.

Figs. 4 and 5 illustrate a modification wherein the width of the slot in the outlet plate 14 is made adjustable. This may be done in a number of ways. As shown, the plate is provided with a movable section 15 guided in the main section 14, and movable by means of the adjusting screw 16. This screw is threaded through a bracket 17 suitably secured in fixed position upon the bottom wall of the furnace, the inner end of the screw being swiveled to the part 15, while the outer end is squared for the application of a turning tool. The edge walls of the electrode surrounding the outlet slot are in this form of device turned downward and fit between the rolls as indicated in Fig. 5. This is the preferred form of construction.

Fig. 6 illustrates a further modification wherein the sizing rolls 18, 18 are located at a point removed from the slotted electrode plate 19 and the glass is conducted to the rolls by the series of rolls 20. In this construction means for interrupting the flow of glass is provided in the form of the cut off block 21 operated by the screw 22 threaded through a depending flange on the electrode plate. The apparatus may be used for melting other materials of a similar character, such as silicate of soda, enamel and the like.

What I claim is:

1. In combination in apparatus for making glass, a tank, a metal electrode constituting a part of one of the walls of the tank and having a slot therethrough, means in opposition to the slot for receiving and carrying away the glass flowing from the slot, a second electrode at a point remote from said first electrode positioned so as to transmit current to the glass in the tank at said point, and means for supplying electric current to the electrodes.

2. In combination in apparatus for making glass, a tank, a metal electrode constituting a part of the bottom wall of the tank and having a slot therethrough, means in opposition to the slot for receiving and carrying away the glass flowing from the slot, a second electrode remote from said first electrode in contact with the glass in the tank, and means for supplying electric current to the electrodes.

3. In combination in apparatus for making glass, a tank, a metal electrode constituting a part of one of the walls of the tank and having a slot therethrough, a pair of sizing rolls in position to receive the flow of glass from the slot and adapted to form it into a sheet of definite thickness, means for conveying the sheet away from the rolls, a second electrode remote from said first electrode in contact with the glass in the tank, and means for supplying electric current to the electrodes.

4. In combination in apparatus for making glass, a tank, a metal electrode constituting a part of one of the walls of the tank and having a slot therethrough, a pair of sizing rolls in opposition to said slot and adapted to receive the glass therefrom and form it into a sheet of definite thickness, means for conveying the sheet away from the rolls, a second electrode remote from the first electrode in contact with the glass in the tank, and means for supplying electric current to the electrodes, said first electrode having the edges of the metal surrounding said slot turned outward and fitting in between the peripheries of said rolls.

5. A tank for melting glass and similar substance, wherein the substance acts as a resistor, comprising a metal electrode constituting one of the walls of the tank, and having an opening therethrough for the discharge of melted material, a second electrode at a point remote from the said first electrode positioned so as to transmit current through the material in the tank at said point, and means for supplying electric current to the electrodes.

Signed at Pittsburgh this 11th day of December, 1930.

HARRY F. HITNER.